United States Patent

Cook et al.

[11] 3,825,319
[45] July 23, 1974

[54] BUTT-JOINED OPTICAL FIBERS

[75] Inventors: John Stone Cook, Summit; Enrique Alfredo Jose Marcatili, Rumson, both of N.J.

[73] Assignee: Bell Telephone Laboratories Incorporated, Murray Hill, N.Y.

[22] Filed: Feb. 26, 1973

[21] Appl. No.: 335,667

[52] U.S. Cl. .................. 350/96 WG, 65/4, 65/37, 65/DIG. 7, 350/96 R
[51] Int. Cl. ............................................. G02b 5/14
[58] Field of Search .................... 350/96 WG, 96 R

[56] References Cited
UNITED STATES PATENTS
3,579,316   5/1971   Dyott et al. ............... 350/96 WG X OTHER PUBLICATIONS
Bisbee "Optical Fiber Joining Technique" The Bell System Technical Journal Vol. 50, No. 10, Dec. 1971, pp. 3,153–3,158.

*Primary Examiner*—John K. Corbin
*Attorney, Agent, or Firm*—D. I. Caplan

[57] ABSTRACT

In order to minimize electromagnetic radiation losses in optical fibers (especially single-mode fibers) at the locations where the fibers are joined together as by butt-joining, such optical fibers are constructed with a reduced diameter at the joint locations. The reduced dimaeters of the fibers at the locations of joining ("joints") cause an increase in the diameter of the cross section of electromagnetic field at these locations. Thereby, electromagnetic radiation losses due to lateral misalignments at joint locations in optical fibers are reduced.

3 Claims, 1 Drawing Figure

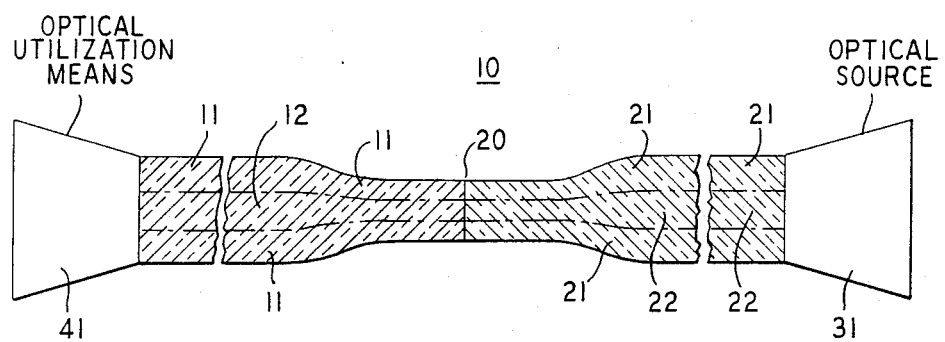

BUTT-JOINED OPTICAL FIBERS

FIELD OF THE INVENTION

This invention relates to the field of optical communication systems, and more particularly to optical fibers.

BACKGROUND OF THE INVENTION

In a practical optical communications system, it is necessary to have optical fibers for propagating optical radiation between distant station locations. Such optical fibers typically include a central core surrounded by a cladding. The distant locations typically are so far apart, however, that it is necessary that the optical fibers be initially fabricated in sections and subsequently joined together. Due to the impossibility of a perfect mechanical alignment at the locations of joining ("joints"), there will be an undesired amount of electromagnetic radiation loss from the propagating optical energy. This is particularly true of single-mode fibers, whose core or field carrying portion may be only a few microns in diameter. Such losses can be very serious in a practical communication system extending over distances of the order of miles or more. It would therefore be desirable to have a method for joining these single-mode optical fibers together without causing as much loss as occasioned by the methods of the prior art.

SUMMARY OF THE INVENTION

This invention is based upon the realization that optical radiation propagating in an optical fiber will have a larger effective cross-section diameter at those locations along the fiber at which the diameter of the fiber is reduced. In turn, this larger effective diameter of the electromagnetic radiation field results in less sensitivity of the electromagnetic fields to certain imperfections and discontinuities in the optical fiber structure at that location; hence, smaller radiation loss will be suffered thereat.

In accordance with the invention, at those locations at which optic fibers are joined, the diameters of the optical fiber (particularly the cores thereof) at these joint locations are made of reduced diameter in comparison with the bulk of the remainder of the fiber along which the propagation of optical radiation occurs. In this way, the optical fiber structure in this invention typically has a uniform diameter along the direction of propagation, except for the locations of joining at which the diameter of the fiber is reduced in accordance with the invention. Consequently, the diameter of the effective cross section of the electromagnetic field is increased at these joints, and radiation losses are reduced thereat. Thus, optical fibers according to this invention are characterized in that the cross-section diameters of the core of an optical fiber are smaller at a joint location than at the bulk of locations (i.e., excluding other joint locations) along the whole fiber between station locations. Most of the distance between station locations is accounted for by said bulk of locations, along which the optical transmission occurs. The electromagnetic radiation losses, due to alignment imperfections at the locations of joining of the fibers, are thereby reduced; thus, optical transmission efficiency is improved.

BRIEF DESCRIPTION OF THE DRAWING

This invention together with its advantages, features and objects may be better understood from a reading of the following detailed description when read in conjunction with the drawing, in which the FIGURE is a diagram of an optical fiber in accordance with the invention.

For the sake of clarity only, the FIGURE is not drawn to scale.

As shown in the FIGURE, an optical fiber 10 is characterized by a joint location 20. At this joint location, a pair of optical fibers 11 and 21, having core portions 12 and 22 respectively, are joined together. This fiber 10 carries optical radiation from an optical source 31 to an optical detector 41. As known in the art, the core portions 12 and 22 of the fiber 10 ordinarily have a higher optical refractive index for the propagating optical radiation than the outer portions of the fiber. The fibers 11 and 21 typically have circularly cylindrical cross sections; and, in accordance with the invention, the diameters of each of their cross sections are smaller at the joint 20 than at locations in each of the fibers in their regions removed from this joint. Thereby, the diameter of the effective cross section of propagating optical radiation is larger at the joint location 20 than in the regions remote from this joint in both the fibers 21 and 22. Thereby, the radiation losses at the joint 20 are minimized.

Typically, the diameter of the cores at the joint 20 is from about 2 to 3 microns for a propagating wavelength of about a micron, with a core-cladding difference in refractive index of about 1/2 percent. At regions remote from the joint 20, the core diameter increases typically to about 4 to 6 microns.

In order to fabricate the fiber 20, a pair of optical fibers, typically in the form of circular cylinders of glass or fused silica, are selected for joining. Advantageously, the two fibers are selected to have substantially the same refractive index profile at least across their sections to be joined. Moreover, to prevent unwanted optical reflections, at least in the immediate neighborhood of their prospective joint location, the core cross-section diameter should not vary by more than one wavelength for at least tens of wavelengths along the length of the core. Both fibers advantageously have substantially identical core cross-section diameters at the joint itself, advantageously to within less than about a tenth of the wavelength. Each of the fibers is heated at a location near their respective ends at which they are to be joined, to a temperature sufficient to permit plastic deformation of the fibers, as known in the art. The heated fibers are then drawn under tension, in order to reduce their diameters near their ends. Next, the fibers are cooled and each of the fibers is nicked (or scratched), with a razor blade or diamond saw blade for example, at the locations of reduced diameters. Then the fibers are broken apart at the point where nicked (or scratched), as by pulling apart under tension, thereby leaving exposed the cut ends (of reduced diameters) on both fibers. Finally, the two fibers are butt-joined together, as by butt-welding their exposed cut ends at an elevated temperature sufficient to flow the materials together as known in the art, or the two fibers are simply butted end-to-end and cemented together, or otherwise mechanically constrained in contiguous proximity to each other.

As an alternative method of joining the optical fibers, instead of first reducing their diameters and then joining them, a pair of fibers of advantageously the same diameter at their exposed ends can be first joined by welding, and then they are pulled apart while the resulting joint is (still) at the elevated temperature. Thereby, the diameter of the joint is reduced in size in comparison with the diameter of both the fibers in their regions more remote from the joint.

Although this invention has been described in detail in terms of a specific embodiment, various modifications can be made without departing from the scope of the invention. For example, optical fibers having continuously graded refracted index profiles can be used, made of various materials such as glasses of various compositions with refractive index properties known in the art. For examples, the parabolic refractive index is useful for many optical systems, as more fully described for example in British Pat. No. 1,277,496 issued to Nippon Selfoc; whereas the discontinuous refractive index profile is also useful in such system, as more fully described in U.S. Pat. No. 3,434,774 issued to S. E. Miller on Mar. 25, 1969. Finally, although the FIGURE indicates (as mentioned above) that it is preferable that the cross section of the optical fiber be minimum at the joint, the advantages of this invention can also be realized even if this condition is not satisfied so long as the cross section at the joint is less than the cross section at the bulk of the remainder of the fiber (apart, of course, from other joints) along which most (if not substantially all) of the distance of optical transmission is accomplished.

Of course, any decrease in the diameter of the joined fibers at the joint ameliorates the problem of radiation loss caused by misalignment. However, for a significant improvement, the ratio of the fiber core diameters in the bulk of the fibers to the core diameter at the joint should be at least about 1.5 to 1, and may be as high as about 3 to 1. Higher ratios than 3 to 1 result in spreading of the electromagnetic field so much beyond the core as to cause undesirable inconvenience in handling in the present state of the art. The transition region along the fiber (from bulk to joint) has a length of typically at least the order of one hundred times the outside diameter of the cladding, as a consequence of the present-day pulling procedures for the reduction of optical fiber diameters, but it should be understood that the length of this transition region need in theory be only sufficiently long to provide a smooth optical transition without reflections, as discussed previously.

What is claimed is:

1. An optical fiber structure which includes at least a pair of optical fibers having core portions which have been joined together at a given joint location, characterized in that the diameters of the cross sections of the cores of both of the optical fibers are smaller by a factor of between about 1.5 and 3 at the joint location than at the bulk of locations along both fibers which are removed from the joint location and which account for most of distance along which optical radiation transmission can occur in the structure.

2. The structure recited in claim 1 in which both fiber portions in the structure have substantially identical cross sections at the joint location.

3. The structure recited in claim 2 in which the linear dimensions of the cross sections of the cores of the joint locations of each of the fiber portions are substantially identical to within less than about a tenth of a wavelength of the optical radiation.

* * * * *